United States Patent

Rennick

[15] 3,636,245

[45] Jan. 18, 1972

[54] MATRIX AMPLIFIER WITH GAIN ADJUSTING MEANS INEFFECTIVE TO ALTER THE COLOR OF BLACK

[72] Inventor: John L. Rennick, Elmwood Park, Ill.

[73] Assignee: Zenith Radio Corporation, Chicago, Ill.

[22] Filed: Aug. 13, 1970

[21] Appl. No.: 63,572

[52] U.S. Cl. ..................................178/5.4 MA, 178/5.4 TE

[51] Int. Cl. ..........................................................H04n 9/50

[58] Field of Search ...................178/5.4 SD, 5.4 TE, 5.4 MA

[56] References Cited

UNITED STATES PATENTS 3,461,225 8/1969 Crookshanks et al.............178/5.4 TE

OTHER PUBLICATIONS

Blaser, L. and Bray, D. " Color TV Processing Using Integrated Circuits," IEEE Trans. Broadcast and Television Receivers, Vol. BTR-12, pp. 54–60, Nov. 1966

*Primary Examiner*—Robert L. Griffin
*Assistant Examiner*—Donald E. Stout
*Attorney*—John J. Pederson and Donald B. Southard

[57] ABSTRACT

A solid-state matrix amplifier network is set forth and described for selectively combining three color-difference signals from a chrominance demodulator with a luminance signal to form suitable color-control drive signals for a three-gun image reproducer of a color television receiver. The matrix amplifier network includes a novel gain adjustment arrangement for obtaining correct grey scale tracking which does not interact with the controls effecting DC setup for the image reproducer nor alter the color of black established during such setup procedures.

10 Claims, 2 Drawing Figures

PATENTED JAN 18 1972 3,636,245

SHEET 1 OF 2

Inventor
John L. Rennick
By [signature]
Attorney

Inventor
John L. Rennick
By [signature]
Attorney

MATRIX AMPLIFIER WITH GAIN ADJUSTING MEANS INEFFECTIVE TO ALTER THE COLOR OF BLACK

BACKGROUND OF THE INVENTION

The present invention relates to improvements in color television receiving systems and, more particularly, to an improved luminance-chrominance matrix amplifier network for use therein.

In accordance with present United States standards governing color television transmissions, luminance information, representing elemental brightness variations in a televised image, is transmitted on an amplitude-modulated main carrier component and chrominance information, representing color hue and saturation variations, is transmitted on a phase- and amplitude-modulated 3.58 MHz. subcarrier component. Demodulation of the luminance component is generally accomplished by means of a conventional AM video detector, and results in a composite video-frequency luminance signal having a bandwidth of approximately 4 MHz. Demodulation of the chrominance component requires in addition a synchronous detector, and results in three color difference signals, commonly designated R–Y, G–Y and B–Y, which represent the difference between the respective primary colors and the transmitted luminance signal.

To control the conventional trigun shadow mask-type cathode-ray tube image reproducer it is necessary to combine, or matrix, the three derived color difference signals with the separately derived luminance signal to form the final primary color control signals, customarily designated R, G and B. While this may be done internally within the image reproducer by applying the signals at a sufficient amplitude directly to respective control elements of the tube, there are certain advantages in matrixing the color difference signals with the luminance or Y signal at a lower level externally to the picture tube and then amplify the resulting R, G and B signals to a level suitable for application to the image reproducer.

A matrix amplifier network appropriate for this purpose, which may comprise a trio of individual amplifiers, one for each primary color, must necessarily meet certain functional requirements. For one, such matrix network must provide direct-current coupling between the luminance and color difference signal sources and the image reproducer to insure faithful reproduction. A reference voltage to which the image reproducer can be setup or adjusted for cutoff must be provided, and suitable control elements are required for effecting individual adjustment of the amplitudes of the color control signals as applied to each gun so as to compensate for varying gun efficiencies without affecting either the reference voltage establishing black level or the direct-current coupling. Furthermore, the network must include suitable peaking circuitry for equalizing the higher frequency video components with the lower frequency chrominance components of the composite video signal.

Arrangements have been devised previously which permit the selective control of the magnitude of the respective primary color signals as applied to the image reproducer without substantially affecting black level as established during setup procedures for the image reproducer. One such arrangement is disclosed in U.S. Pat. No. 3,586,766, issued June 22, 1971 to Charles H. Heuer and Dwight J. Poppy, and assigned to the same assignee as the present invention. However, such matrix amplifier network as there disclosed pertains to high-level tracking wherein adjustable potentiometers are included in the collector circuits of the respective matrix amplifiers. No current flows in such potentiometers at black level operating conditions. Hence individual adjustment of the potentiometers will not alter the reference conditions, or color of black, only the color or white when current flow is present in the respective collector circuits.

Such an arrangement would not be effective for low-level tracking, i.e., the gain adjustment control elements being in the low-impedance emitter circuits of the matrix amplifiers. Unless the individual transistors comprising the matrix amplifiers are completely at cutoff, any gain adjustments effected adversely interact with the reference conditions established during setup procedure. In other words, the color of black is altered along with the color of white when making gain adjustments for the respective matrix amplifiers. There are, however, instances in which it may well prove desirable to effect low-level tracking as contrasted with high-level tracking. For example, with gain adjustment controls included in the low-impedance emitter circuits, the collector capacitive loading normally associated with grey scale tracking circuitry in a color difference receiver are eliminated and a wider bandwidth amplifier results.

SUMMARY OF THE INVENTION

Accordingly, it is a general object of the invention to provide a new and improved matrix amplifier network with low level tracking arrangement for use in a color television receiver.

It is a more specific object of the invention to provide a solid-state matrix amplifier network having respective gain adjustment control elements for grey scale tracking which are ineffective to alter the color of black as established during setup procedures for the image reproducer.

Another object of the present invention is to provide a matrix amplifier network of the foregoing type which offers improved long-term DC stability and improved frequency response.

In accordance with the present invention, a new and improved matrix amplifier network is provided for a color television receiver for combining a received luminance signal with a plurality of derived color difference signals to form color control signals for the associated color image reproducer. The matrix network comprises respective amplifier devices having input, output and common electrodes and means for supplying operating power thereto. The luminance signal is applied to the common electrodes connected in parallel and the derived color difference signals to respective ones of the input electrodes. Means in the form of an adjustable resistance is included in the common electrode, or low impedance side, of each of the matrix amplifier devices to selectively control the gain thereof so as to provide correct grey scale tracking. A reference voltage is established at the output of each of the matrix amplifiers which corresponds to the desired reference black level. Means in the form of a high-voltage divider network is provided for applying an appropriate bias voltage to each of the second control, or screen grids of the image reproducer to effectively control the cutoff point for each of the electron guns at this reference voltage and thereby establish the desired black level for the image reproducer.

A further predetermined or reference potential is caused to be developed across a control element in each of the matrix amplifier devices which is representative of the conduction level of the amplifiers operating at reference black level. Threshold conduction means is included in the matrix amplifier network which open-circuits the aforementioned gain adjustment controls at or below the predetermined voltage level as developed across the control elements and corresponding to reference black level. Accordingly, selective gain control is permitted for each of the matrix amplifiers at conduction levels above black level to provide the desired grey scale tracking, but which gain control adjustments are effectively nullified at or below the conduction level set for black, or cutoff of the image reproducer. Accordingly, the color of black, once established during setup procedures, is effectively maintained despite selective gain adjustments for the matrix amplifiers operating above reference black level.

BRIEF DESCRIPTION OF THE DRAWING

The features of the present invention which are believed to be novel are set forth with particularity in the appended claims. The invention, together with the further objects and advantages thereof, may best be understood by reference to the accompanying drawings, in which:

DESCRIPTION OF THE PREFERRED EMBODIMENT

Figure 1:
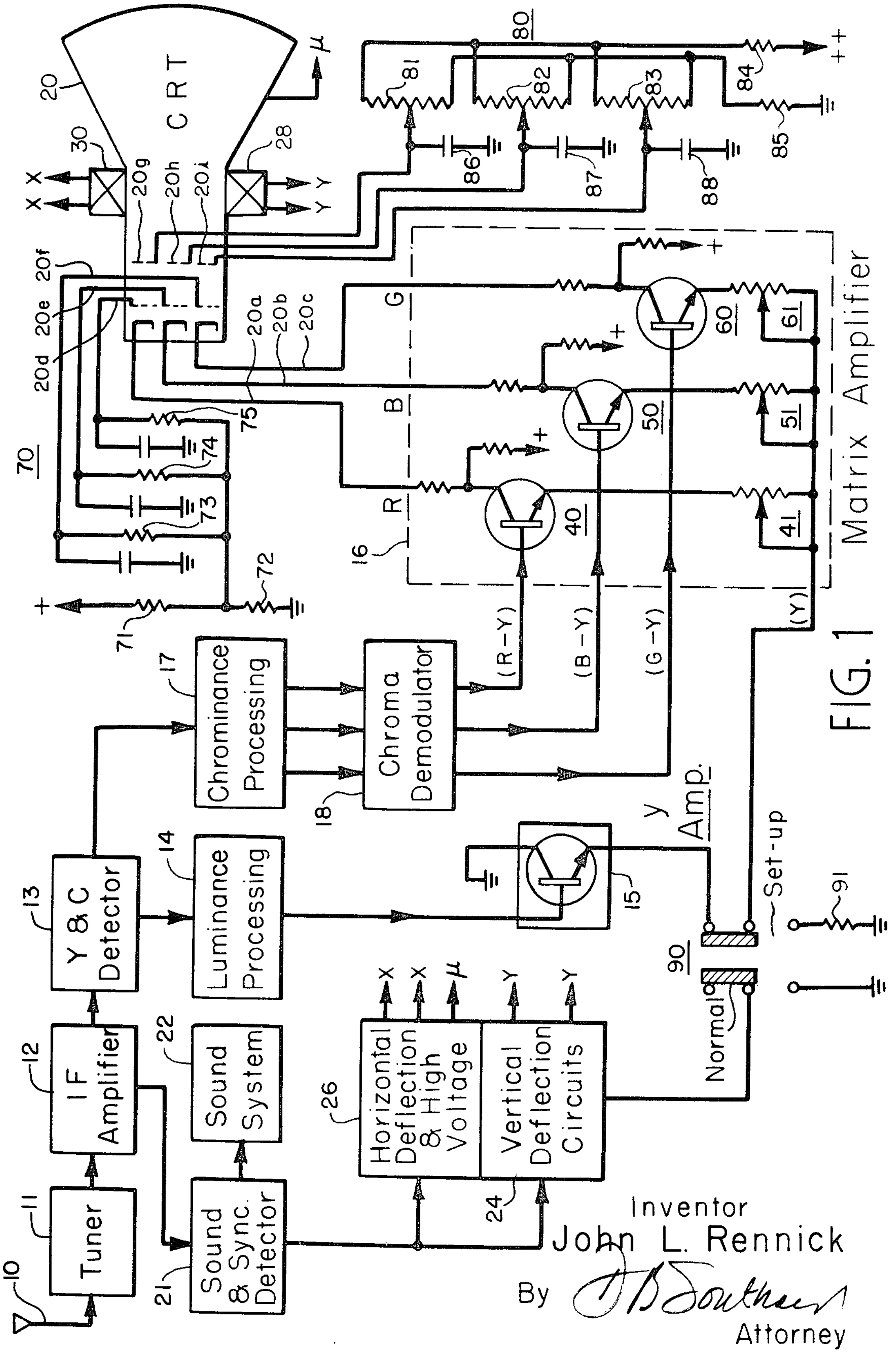
FIG. 1 illustrates a color television receiver in schematic and block diagram form which includes circuitry for DC setup and establishing black level and a matrix amplifier network with selective gain controls for grey scale tracking.

With the exception of certain detailed circuitry in the luminance-chrominance matrix amplifier network as will be subsequently described, the illustrated color television receiver is essentially conventional in design and, accordingly, only a brief description of its structure and operation need be given here. The television receiver in its broader aspects is shown in FIG. 1. A received signal is intercepted by an antenna 10 and coupled in a conventional manner to a tuner 11, which includes the usual radiofrequency amplifying and heterodyning stages for translating the signal to an intermediate frequency. After amplification by an intermediate frequency (IF) amplifier 12, the signal is applied to a luminance and chrominance (Y and C) detector 13 wherein luminance and chrominance information in the form of a composite video-frequency signal is derived. The luminance component of this signal is amplified in a luminance processing channel 14 and applied through an output luminance (Y) amplifier stage 15 to a luminance-chrominance matrix amplifier network 16, wherein it is combined with conventional R–Y, G–Y and B–Y color difference signals independently derived by the receiver chrominance demodulator 18, thereby developing suitable color drive signals for the red, green and blue cathodes, **20*a*, 20*b* and 20*c*, respectively, of the receiver image reproducer 20**.

The output signal from if amplifier stage 12 is also applied to a sound and sync detector 21, wherein a second composite video-frequency signal is derived which includes both sound and synchronizing components. The sound component is applied to sound circuits 22, wherein conventional sound demodulation and amplification circuitry is included to develop the audio portion of the received signal. Vertical and horizontal sync pulses are applied by sound and sync detector 21 to respective horizontal and vertical deflection circuits or stages 24 and 26, respectively. Vertical deflection circuits 24 utilize the vertical sync pulses to generate a synchronized vertical rate sawtooth scanning signal in a vertical deflection winding 28 positioned about the neck portion of the image reproducer 20. The horizontal deflection and high-voltage circuits 26 includes conventional reaction scanning type circuitry for utilizing the horizontal sync pulses to generate a synchronized horizontal rate sawtooth scanning current in an associated horizontal deflection winding 30, and also high voltage DC accelerating potential $\mu$ for the ultor electrode of image reproducer 20.

The chrominance signal from Y and C detector 13, which includes color subcarrier and synchronizing burst components, is applied to a chrominance processing channel 17, wherein suitable chrominance information is separated from the composite chrominance signal in the well-known manner and applied to the chroma demodulator 18 along with reference signals of the appropriate phase from a subcarrier regeneration arrangement (not shown). Demodulator 18 is a synchronous detector, preferably of the monolithic or integrated circuit type as set forth in U.S. Pat. No. 3,506,776 issued to John L. Rennick and assigned to the same assignee as the present invention.

The amplified luminance signal from the output or final Y amplifier 15 is applied to one input of the matrix amplifier network 16 and the R–Y, B–Y and G–Y color difference signals from chrominance demodulator 18 are applied to still other inputs thereof wherein the respective signals are mixed and appear at respective outputs of the matrix network as R, B and G color control signals suitable for application to image reproducer 20. Matrix network 16 includes separate amplifier devices for developing each of the R, G and B color signals. The matrix amplifiers are preferably of the solid-state type for continuity of DC coupling and accordingly include transistors 40, 50 and 60. The particular color difference signal is applied to each of the base input electrodes of transistors 40, 50 and 60 with the luminance signal being applied to the common emitter electrodes connected in parallel to a common feed point. The collector circuits of transistors 40, 50 and 60 thus serve as the respective outputs at which the primary R, G and B color signals are developed. Further, each of the transistor amplifiers 40, 50 and 60 include a suitable adjustable control element for selectively determining the gain thereof for effecting correct grey scale tracking. For low-level tracking, such gain control elements must be located on the low-impedance side of the amplifiers, or in this case, in the common emitter circuits, as indicated at 41, 51 and 61, respectively.

For faithful color reproduction it is desirable that the image reproducer be direct-current coupled to the luminance and chrominance detectors, which necessitates that these detectors be direct-current coupled to the matrix amplifiers and that the matrix amplifiers in turn be direct-current coupled to image reproducer 20. It is also desirable that means be provided for individually adjusting the drive to the three guns of the image reproducer to compensate for varying electron gun efficiencies, and that this adjustment must not interfere to any substantial degree with the reference direct-current coupling. Furthermore, with present cathode-ray image reproducers, it is desirable that the individual electron guns be operated at a relatively high cutoff potential to achieve the small spot size necessary for good detail in the reproduced image. In practice, the second control, or screen grid potential as applied to each gun is such that the guns operate with a grid-to-cathode cutoff characteristic on the order of 150 volts. The grid-to-cathode cutoff point for the picture tube thereby establishes the reference black level for the televised images reproduced on the screen of tube 20. In any event, the 150 volt cutoff level establishes the requirement that a positive potential of at least 150 volts appear on each cathode to completely cutoff the picture tube. This assumes the control grids of the guns to be at ground potential, but in practice these grids are maintained at a positive potential of some 30 volts so that the matrix amplifier transistors 40, 50 and 60 in network 16 need not be operated close to saturation to achieve full beam current. While this avoids possible nonlinear operation and mistracking of the transistors at high brightness levels, it does impose a requirement that some 180 volts be applied to the cathodes for complete beam current cutoff. In the illustrated embodiment, the 30 volt potential is established by means of a two-element voltage divider network 70 comprising resistors 71 and 72 connected between a source of potential (+) and ground, the juncture of these resistors being coupled by individual current limiting resistors 73, 74 and 75 to the individually bypassed first control grids **20*d*, 20*e* and 20*f*, respectively, of image reproducer 20**.

To avoid the possibility of nonlinear operation of the matrix amplifier transistors and accompanying black compression in the reproduced image, the collectors of the transistors are operated from a supply voltage of approximately 270 volts. This allows the 180 volt collector voltage required for cutoff of the picture tube to be achieved without the transistors 40, 50 and 60 themselves being completely cutoff. Variations in electron gun characteristics and matrix amplifier circuitry make it necessary to provide means for individually adjusting the cutoff of each gun to insure that the three guns will be cutoff concurrently, and in the illustrated embodiment these means take the form of a voltage divider network 80 comprising potentiometers 81, 82 and 83, which individually vary the screen grid voltages on the three guns. One end terminal of each potentiometer is connected to the receiver boost supply (++) through a common series voltage dropping resistor 84 with the other end terminal thereof being connected to ground through a common voltage dropping resistor 85. The arms of the potentiometers, individually bypassed to ground at signal frequencies through associated capacitors 86, 87 and 88, are connected directly to a respective screen grid, 20*g*, 20*h* or 20*i*. Through selection of resistance values, the range of adjustment provided by network 80 is approximately 550 to 700 volts, corresponding to a range of applied cutoff voltages from 140 volts to 180 volts.

Actual adjustment of cutoff is accomplished by actuating an included mode switch 90 to its "setup" position, which interrupts the application of the luminance signal to matrix amplifiers 40, 50 and 60 and provides a reference gain level such as by connecting the emitter electrodes to a reference plane (ground) through a common emitter impedance, resistor 91. Further, mode switch 90 in its setup mode position disables the vertical deflection circuits 24 for ease in comparing the relative brightness of the displays from the three electron guns. It will be understood that the foregoing causes a predetermined degree of conduction for the three matrix amplifier transistors, 40, 50 and 60, with a predetermined positive potential resulting at each of their collector electrodes corresponding to a level of conduction indicative of reference black level. Potentiometers 81, 82 and 83 may be adjusted so that each gun is just extinguished, or cutoff, as determined by visual observation of its display on the receiver viewing screen. The cutoff characteristics having been thus adjusted to a common emitter reference voltage, mode switch 90 may be returned to its normal position for applying luminance (Y) signal to the matrix amplifier network 16 and to permit vertical deflection circuits 24 to be reactivated.

The respective adjustable gain control elements 41, 51 and 61 for matrix amplifier 40, 50 and 60 may be individually set or adjusted so as to provide correct "tracking" at all brightness levels. That is, it is desired that the color picture tube 20 reproduce white information with the proper color temperature at all brightness levels between minimum and maximum white. This requires discrete gain level adjustments for each of the matrix amplifiers 40, 50 and 60. However, without more, it will be realized that unless the transistor matrix amplifiers 40, 50 and 60 are completely cutoff (nonconductive) at the reference black level as established during setup procedures, the DC potentials on the screen grids 20*g*, 20*h* and 20*i* determined by the adjustable control elements 81, 82 and 83 adversely interact with subsequent gain level adjustments determined by the adjustable control elements 41, 51 and 61. As previously noted, the transistors functioning as matrix amplifiers 40, 50 and 60 are in fact not completely cutoff at reference black level to avoid the possibility of nonlinear operation and attendant black compression in the reproduced image. Accordingly, under these conditions, each gain adjustment effected through control elements 41, 51 and 61 necessarily requires a further readjustment of the DC setup control elements 81, 82 and 83, and vice versa, until precisely the right conditions are established. This obviously is rather tedious and time-consuming procedure, requiring no little patience and ingenuity on the part of the individual effecting the setup reference conditions for the color television receiver.

Figure 2:
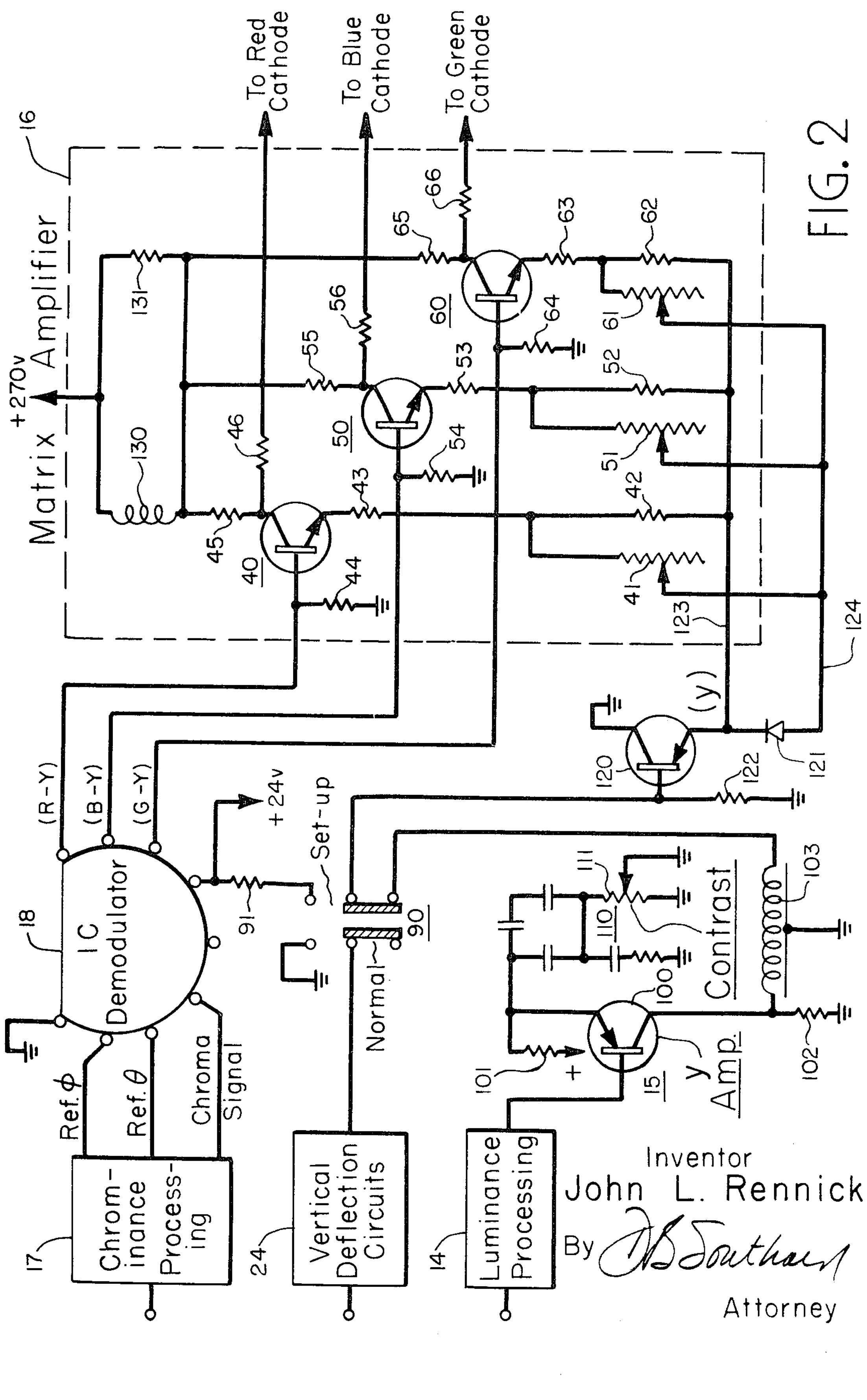
FIG. 2 is a partial schematic and block diagram of the television receiver of FIG. 1 showing in detail the matrix amplifier network and associated circuitry as constructed in accordance with the present invention.

As shown in FIG. 2, matrix amplifier network 16 in one embodiment of the invention includes the three transistor matrix amplifiers 40, 50 and 60 for developing the required R, G, B primary color drive signals as applied to the associated cathodes of the image reproducer 20. The respective color difference signals R–Y, G–Y and B–Y are applied to the base input electrodes of the particular matrix amplifier with the luminance signal being applied to the emitter electrodes connected in parallel through associated load impedances comprising serially connected resistances 42–43, 52–53 and 62–63 in conjunction with the variable resistances 41, 51 and 61, as shown. The variable resistance elements 41, 51 and 61 include one end terminal connected to the juncture of the fixed resistances 42–43, 52–53 and 62–63, respectively, and thus are effectively in parallel with resistance elements 42, 52 and 62 when a further terminal thereof is connected in a manner to be subsequently described. The end terminals of resistances 42, 52 and 62 remote from the associated matrix amplifiers are connected to a common reference or feed point, designated 123, and the center taps or movable arms of potentiometers 41, 51 and 61 are connected to a common reference point 124. A threshold conduction device, such as a diode 121, is connected between reference points 123 and 124, as illustrated, which diode is poled to conduct whenever the voltage drop appearing across the collective resistance networks 41–42, 51–52 and 61–62 exceeds its threshold conduction level.

As shown, reference point 123 is connected to the output of a transistor amplifier 120 serving as an emitter-follower for applying the luminance or Y signal to the matrix amplifiers 40, 50 and 60. As such, the emitter electrode of transistor amplifier 120 serves as its output and the base electrode as its input with the collector electrode being returned to ground. The luminance signal itself is derived in the luminance processing channel 14 and applied to the base input of the Y-amplifier stage 15, which includes a transistor 100. Operating power is applied to its emitter circuit through a load resistance 101 and the output is taken at its collector returned to ground through an additional load resistance 102. A resistance-capacitance network 110 is included in the emitter circuit of transistor 100 which effects appropriate action for the higher signal frequencies in a known manner, with a portion of such network in the form of a potentiometer 111 effecting variable emitter degeneration and thus providing suitable contrast control.

The amplified Y signal at the output collector of transistor 100 drives a delay line 103 to effect the appropriate delay for the luminance signal to match the inherent delay of the chrominance signal imposed in the chrominance processing channel comprising stages 17 and 18. Delay line 103 is terminated at respective ends in its approximate characteristic impedance by resistors 102 and 122 so as to minimize undesirable reflections. The application of the Y-signal from amplifier 15 to emitter-follower 120 is effected through one section of the mode switch 90. In the normal position, mode switch 90 provides electrical continuity between the output terminal of the delay line 103 and the input base electrode of emitter-follower 120. In its setup operational mode, switch 90 is effective to interrupt the Y-signal at the input to emitter-follower 120 and disable the vertical deflection circuits 24 as previously described.

To complete the circuit arrangement for matrix amplifier network 16, each of the transistor amplifiers 40, 50 and 60 include a resistance network across which forward bias is developed and operating power applied to the respective amplifier stages. Transistor amplifier 40 includes a resistance 44 connected between its input base and a reference potential (ground) and a resistance 45 connected between its collector and a source of operating potential, as obtained through a parallel connected inductance 130 and resistance 131. A further resistance 46 is interposed between the collector of transistor amplifier 40 and the red cathode 20*c* of the image reproducer 20, for applying thereto the matrix derived primary color signal R. Similarly, transistor amplifier 50 includes corresponding resistance elements 53, 54, 55 and 56 and transistor amplifier 60 includes resistance elements 63, 64, 65 and 66. Inductance 130 serves as a peaking coil common to each of the amplifiers 40, 50 and 60.

In operation, proper grid-to-cathode cutoff potentials are established for the various electron guns of the image reproducer 20 as previously described. Mode switch 90 is actuated to its setup position to deactivate vertical deflection circuits 24 and interrupt the application of the Y signal to emitter-follower 120. A reference voltage is caused to be applied to the base input of transistor emitter-follower 120 through a resistance 91 connected to a source of operating potential. The reference voltage at the input of transistor 120 effects a predetermined conduction level therefor which in turn causes similar predetermined conduction levels for each of the matrix amplifier transistors 40, 50 and 60, since the emitter load resistances of the latter are returned to ground through the collector-emitter circuit of transistor emitter-follower 120. Consequently, a predetermined voltage level or potential appears at the collector of each of the amplifiers 40, 50 and 60. The cutoff potential for the image reproducer 20 is then adjusted through the action of potentiometers 81, 82 and 83 of voltage divider network 80 as previously described. This establishes the correct setup conditions and the reference black level during subsequent image reproduction on received signals.

At this reference black level, the circuit elements for transistor amplifiers 40, 50 and 60 are selected such that a predetermined voltage drop appears across resistance elements 42, 52 and 62, which voltage drop is made to substantially compare with the threshold conduction level of diode 121. That is, if diode 121 has a threshold conduction level of approximately 0.7 volts, then the circuit elements comprising the transistor amplifiers 40, 50 and 60 are to be selected such that a corresponding voltage level of approximately 0.7 volts appears across resistances 42, 52 and 62 when matrix amplifiers 40, 50 and 60 are at a conduction level representative of the established reference black level. Accordingly, the voltage drop so developed across the resistances 42, 52 and 62, and thus in turn impressed across the diode 121, will be insufficient to render diode 121 conductive. With diode 121 nonconductive, adjustable resistance elements 41, 51 and 61 are effectively open-circuited in the emitter paths of transistors 40, 50 and 60 such that the resultant gain levels are determined solely by fixed and nonadjustable resistance elements 42–45, 52–55 and 62–65. The "color" of black is thus rendered unalterable once established during setup procedures.

At higher conduction levels for the transistor amplifiers 40, 50 and 60 representing televised images with elemental brightness or white information, the voltage drop developed across resistance elements 42, 52 and 62 is of sufficient magnitude to exceed the threshold conduction level of diode 121. With diode 121 rendered conductive, adjustable resistances 41, 51 and 61 are effectively connected in parallel with associated fixed resistances 42, 52 and 62, respectively, and therefor capable of selectively controlling the gain of amplifiers 40, 50 and 60 by variable emitter degeneration action. Appropriate gain control adjustments for the various matrix amplifiers permit correct grey scale tracking in the conventional manner. However, varying control elements 41, 51 and 61 to alter gain levels for matrix amplifiers 40, 50 and 60 are effective to change the color of white only . . . and not that of black. The latter is established during setup procedures and thereafter maintained by fixed operational parameters and nonadjustable circuit elements. Interaction between amplifier gain controls and DC setup controls is avoided, and setup procedures considerably simplified as are the adjustments to effect correct grey scale tracking.

The following component types and circuit values for the illustrated circuitry have been found to provide satisfactory operation in accordance with the invention. It is to be understood, however, that such are intended only by way of illustration and not as limitations:

| | | |
|---|---|---|
| Transistors 40, 50, 60 | type | Fairchild FT123 |
| Transistor 120 | type | 2N3638 |
| Potentiometers 41, 51, 61 | ohms | 500 |
| Resistances 42, 52, 62 | ohms | 150 |
| Resistances 43, 53, 63 | ohms | 150 |
| Resistances 44, 54, 64 | ohms | 3,300 |
| Resistances 45, 55, 65, 131 | ohms | 10,000 |
| Resistances 46, 56, 66 | ohms | 1,000 |
| Resistance 91 | ohms | 6,200 |
| Resistance 122 | ohms | 2,700 |
| Inductance 130 | microhenrys | 470 |
| Diode 121 | type | 1N457 |

While only a specific embodiment of the invention is shown and described herein, it will of course be understood that other variations and modifications may be effected without departing from the true scope and spirit of the invention. The appended claims are intended to cover all such modifications and alternative constructions that fall with the true scope and spirit.

What is claimed is:

1. In a color television receiver having a cathode-ray tube image reproducer, a source of luminance signals and a source of chrominance signals, a matrix amplifier stage, comprising in combination:
   - an amplifier device having input, output and common electrodes and responsive to applied luminance and chrominance signals to develop a primary color control signal by matrixing action at said output;
   - means for establishing a predetermined conduction level for said amplifier device corresponding to a reference beam-current in the image reproducer representative of black level;
   - variable control means for selectively altering the gain of said amplifier device; and
   - circuit means for effectively rendering said control means ineffective to vary the gain of said amplifier device when operating at or below said predetermined conduction level corresponding to reference black level, but said circuit means rendering said control means effective to vary the gain of said amplifier device when operating above said predetermined conduction level.

2. A matrix amplifier in accordance with claim 1 wherein said amplifier includes a transistor device having a base input circuit for applying the chrominance signal, a common emitter circuit for applying the luminance signal, and an output collector circuit at which a resultant primary color control signal is developed by matrixing action.

3. A matrix amplifier in accordance with claim 2 wherein said control means for selectively altering the gain of said amplifier device includes a fixed resistance interposed in the circuit of said common emitter and a variable resistance in parallel with said fixed resistance, the selective adjustment of said variable resistance being effective to alter the gain of said amplifier within a predetermined range by emitter degeneration action.

4. A matrix amplifier in accordance with claim 3 wherein said circuit means includes a diode connected in series with said adjustable resistance across said fixed resistance, said diode having a threshold conduction level which is greater than the voltage developed across said fixed resistance when said amplifier device is at or below said predetermined conduction level corresponding to reference level black.

5. A matrix amplifier stage for a color television receiver having a cathode-ray tube image reproducer and respective sources of luminance and chrominance signals, comprising in combination:
   - an amplifier device including a transistor having an input base circuit for applying the chrominance signal, a common emitter circuit to which the luminance signal may be applied and an output collector circuit wherein a matrixed primary color signal is developed;
   - an impedance network interposed in said common emitter circuit of said transistor matrix amplifier comprising a variable impedance connected in series with a threshold conduction device, said variable impedance network and said threshold conduction device connected in parallel with a fixed impedance, said variable impedance being effective to selectively alter the gain of said matrix amplifier by emitter degeneration action when said threshold conduction device is rendered conductive by a sufficient voltage appearing across said fixed impedance, but said variable impedance being ineffective to selectively alter the gain of said matrix amplifier by emitter degeneration action when said threshold conduction device is rendered nonconductive; and
   - circuit means coupled to said matrix amplifier for establishing a predetermined conduction level therein corresponding to a reference beam-current in the image reproducer representative of black level, and for further establishing a control voltage across said fixed impedance insufficient to render said threshold conduction device conductive when said matrix amplifier is operating at or below said predetermined conduction level.

6. A matrix amplifier stage in accordance with claim 5 wherein said circuit means includes a second transistor connected as an emitter-follower with an emitter electrode connected to said impedance network at a point remote from said matrix amplifier, a base electrode and a common collector electrode returned to a plane of reference potential, said circuit means further including switch means having a first selectable mode for coupling said base of said second transistor to the source of luminance signal and a second selectable operational mode for applying a reference potential to said base of said second transistor to establish a conduction level therein sufficient to effect said predetermined conduction level for said matrix amplifier corresponding to reference black level.

7. A matrix amplifier stage in accordance with claim 5 wherein said variable impedance includes a resistive potentiometer, said fixed impedance a resistance, and said threshold conduction device a diode.

8. A matrix amplifier stage in accordance with claim 1 wherein said stage comprises:

at least one additional amplifier device having input, output and common electrodes;

additional means for establishing a predetermined conduction level in said additional amplifier device corresponding to said same reference beam current in the image reproducer representative of black level;

additional control means for selectively altering the gain of said additional amplifier device; and additional circuit means for rendering said additional control means ineffective to vary the gain of said additional amplifier device when operating at or below said predetermined conduction level corresponding to black level.

9. A matrix amplifier stage in accordance with claim 5 wherein said stage comprises:

at least one additional transistor amplifier device having input base, output collector and common emitter circuits;

an additional impedance network interposed in said emitter circuit of said additional matrix amplifier comprising an additional fixed resistance and an additional variable impedance connected in parallel with said additional fixed resistance and in series with said one threshold conduction device, said additional variable impedance being effective to alter the gain of said additional matrix amplifier when said one threshold conduction device is conductive and ineffective to alter said gain when nonconductive;

said one circuit means being further coupled to said additional matrix amplifier to establish said same predetermined conductive level therein corresponding to said reference-beam current in the image reproducer representative of black level.

10. A matrix amplifier stage for a color television receiver having a cathode-ray tube image reproducer, a source of respective color difference signals, and a source of luminance signals, comprising in combination:

a plurality of transistor amplifier devices each having a base input to which a respective color difference signal is applied, a common emitter to which the luminance signal is applied, and an output collector at which respective primary color signals are developed by matrixing action;

a fixed impedance connected between each of said emitters and a first reference point and a variable impedance connected between each of said emitters and a second reference point, said variable impedances being effective to selectively alter the gain of each of said amplifier devices by degenerative action;

a threshold conduction device interconnected between said first and second reference points for rendering each of said variable impedances ineffective to alter said gains when nonconductive but effective to alter said gains when conductive; and means, including switch means, coupled to said first reference point for establishing a predetermined conduction level for each of said amplifier devices corresponding to a reference beam current in the image reproducer representative of black level, and for further establishing a control voltage across each of said fixed impedances which is insufficient to render said threshold conductive device conductive when said amplifier devices are operating at or below said predetermined conduction level corresponding to reference black level.

* * * * *